United States Patent
Hayashi

(10) Patent No.: US 9,956,988 B2
(45) Date of Patent: May 1, 2018

(54) ROTATING ELECTRICAL MACHINE

(71) Applicant: DENSO CORPORATION, Kariya, Aichi-pref. (JP)

(72) Inventor: Jirou Hayashi, Kariya (JP)

(73) Assignee: DENSO CORPORATION, Kariya (JP)

(*) Notice: Subject to any disclaimer, the term of this patent is extended or adjusted under 35 U.S.C. 154(b) by 329 days.

(21) Appl. No.: 15/001,654

(22) Filed: Jan. 20, 2016

(65) Prior Publication Data
US 2016/0218597 A1  Jul. 28, 2016

(30) Foreign Application Priority Data

Jan. 26, 2015 (JP) .................... 2015-12473

(51) Int. Cl.
| | |
|---|---|
| B62D 5/04 | (2006.01) |
| H02K 1/18 | (2006.01) |
| H02K 15/02 | (2006.01) |
| H02K 15/14 | (2006.01) |
| H02K 5/15 | (2006.01) |
| H02K 5/173 | (2006.01) |
| H02K 11/33 | (2016.01) |
| H02K 5/10 | (2006.01) |

(52) U.S. Cl.
CPC ............ *B62D 5/04* (2013.01); *B62D 5/0406* (2013.01); *H02K 1/185* (2013.01); *H02K 5/15* (2013.01); *H02K 5/1732* (2013.01); *H02K 11/33* (2016.01); *H02K 15/028* (2013.01); *H02K 15/14* (2013.01); *B60L 2220/50* (2013.01); *B60L 2240/425* (2013.01); *H02K 5/10* (2013.01); *H02K 2213/03* (2013.01); *Y02T 10/641* (2013.01); *Y02T 10/642* (2013.01)

(58) Field of Classification Search
CPC .......... B62D 5/04; B62D 5/0406; H02K 5/15; H02K 11/33; H02K 15/028; H02K 15/14
See application file for complete search history.

(56) References Cited

U.S. PATENT DOCUMENTS

| | | |
|---|---|---|
| 2011/0254411 A1 | 10/2011 | Minato |
| 2013/0257232 A1 | 10/2013 | Tomizawa et al. |
| 2016/0020678 A1* | 1/2016 | Hirano .................... H02K 5/18 310/64 |
| 2016/0036299 A1 | 2/2016 | Hayashi |

* cited by examiner

Primary Examiner — Ramon M Barrera

(57) ABSTRACT

A frame of an electric motor opens in one end. A heat sink, to which a control substrate is connected, closes an opening of the frame. A stator is positioned on an inner circumferential surface of the frame to be movable in an axis of rotation direction. A fastening bolt penetrates through the heat sink and a motor cover to fasten to the frame, thereby holding the stator between a pressing portion formed on the heat sink and a stepped portion formed on the inner circumferential surface to fix the stator to the frame. A disc spring is interposed between a front bearing that retains a rotor shaft and a spring retainer formed in the heat sink, and the rotor shaft is biased in the axis of rotation direction by a biasing force from the disc spring.

8 Claims, 7 Drawing Sheets

ROTATING ELECTRICAL MACHINE

CROSS REFERENCE TO RELATED APPLICATION

The present application is based on Japanese Patent Application No. 2015-012473 filed on Jan. 26, 2015, disclosure of which is incorporated herein by reference.

TECHNICAL FIELD

The present disclosure relates to a rotating electrical machine that generates electricity by rotating a rotor, or that rotates a rotor when supplied with electric power.

BACKGROUND

Conventionally, rotating electrical machines include a stator fixed to the inner circumferential surface of a motor housing, and a rotor rotatably attached to the motor housing so as to face the stator in the radial direction (see, for example, JP 2013-207968A). Such a conventional electrical rotating machine may function as an electrical motor in which external electric power is supplied to rotate the rotor, or function as a generator in which the stator generates electric power due to the rotor rotating.

SUMMARY

In rotating electrical machines, the stator must be fixed to the inner circumferential surface of the motor housing with at least a predetermined retention force. Typically, the stators of rotating electrical machines are fixed to the motor housing by interference fitting or shrink fitting. Accordingly, the amount of interference between the outer diameter of the stator and the inner diameter of the motor housing must be at least some predetermined value.

If the amount of interference between the stator and the motor housing is too high, the fitting load between the stator and the motor housing will increase. As a result, the fitting process may be impaired, and the stator may be damaged. Further, if the amount of interference between the stator and the motor housing is too high, strains and stresses are applied to the stator, and core losses by the stator core may increase. For these reasons, when constructing a rotating electrical machine, it is necessary to strictly control the measurement precision of the stator outer diameter and the motor housing inner diameter, which may be difficult.

In view of the above, it is an object of the present disclosure to provide a rotating electrical machine that increases the stator retention force of a housing, and that is easy to manufacture.

In view of the above points, according to the present disclosure there is provided a rotating electrical machine including a housing having at least one end in an axis of rotation direction that is open, the housing being cylindrical, a stator fixed to an inner circumferential surface of the housing, a rotor rotatably mounted in the housing to face the stator in a radial direction, a heat sink disposed to close an opening of the housing, a control substrate abuttedly mounted to the heat sink, the control substrate controlling a supply of electric power to the stator, a locking portion formed on the inner circumferential surface of the housing, the locking portion restricting the stator from moving toward an other end in the axis of rotation direction, a pressing portion formed on a side of the heat sink facing toward the other end in the axis of rotation direction, the pressing portion abutting the stator, and a fastening member that penetrates through the heat sink to fasten to the housing, the fastening member holding the stator between the pressing portion and the locking portion in the axis of rotation direction to fix the stator.

According to this configuration, the fastening member that penetrates through the heat sink is fastened to the housing to fix the stator which is held between the pressing portion and the locking portion in the axis of rotation direction. Accordingly, when manufacturing the rotating electrical machine, the stator may be movable in the axis of rotation direction with respect to the housing, and it is not necessary to ensure that an interference exists between the outer diameter of the stator and the inner diameter of the housing. As a result, it is not necessary to strictly control the dimensions of the outer diameter of the stator and the inner diameter of the frame, and the electric motor may be manufactured easily. Further, the stator may be fixedly held between the pressing portion of the heat sink and the stepped portion of the frame without stator being mated to the frame. Accordingly, the retention force applied by the frame on the stator may be improved.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION (Configuration of Electric Power Steering Device)

Figure 1:
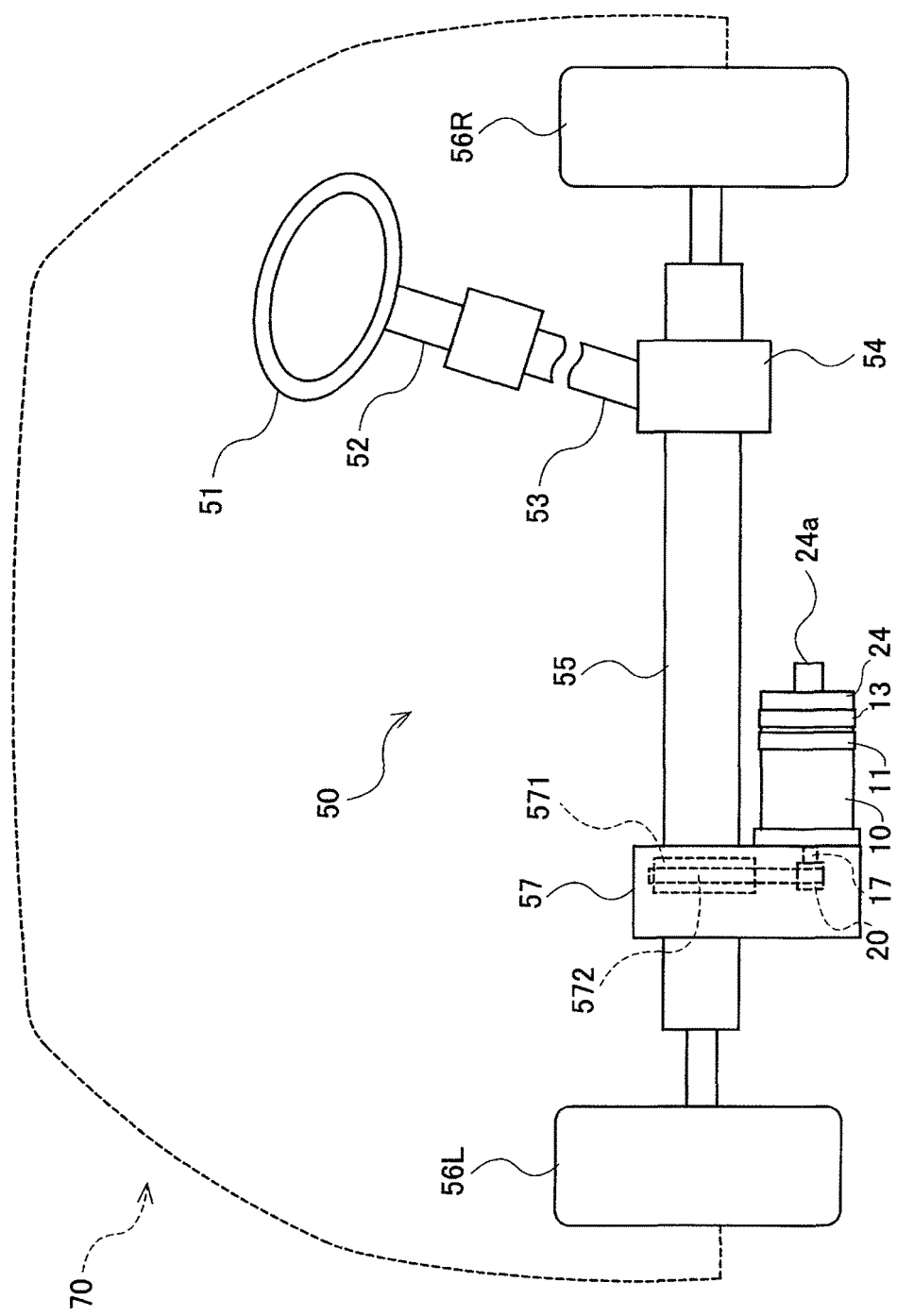
FIG. 1 is a simplified view of an electric power steering device mounted on a vehicle.

An electric power steering device 50 that includes an electric motor 10 (corresponding to a rotating electrical machine) according to a first embodiment of the present disclosure will be explained with reference to FIG. 1. As shown in FIG. 1, the electric power steering device 50 is mounted in a vehicle 70, and includes a steering wheel 51 that is rotatably operated by a driver. A steering shaft 52 connects the steering wheel 51 to an intermediate shaft 53. The intermediate shaft 53 is connected through a rack and pinion mechanism 54 to a rack shaft 55. The two ends of the rack shaft 55 are connected to a pair of steered wheels 56R, 56L (corresponding to wheels of a vehicle).

Accordingly, when the steering wheel 51 is rotatably operated, the rotation motion is transmitted through the steering shaft 52 and the intermediate shaft 53, and this rotation motion is converted by the rack and pinion mechanism 54 into a linear motion of the rack shaft 55 in an axial direction. As the rack shaft 55 moves in the axial direction, the steered wheels 56R, 56L are steered by an angle commensurate with the operation amount applied to the steering wheel 51.

The rack shaft 55 is connected to an electric motor 10 through a power transmission device 57. Specifically, the rack shaft 55 is engaged to a driven-side pulley 571 included in the power transmission device 57. The driven-side pulley 571 is rotatable with respect to the rack shaft 55, and is disposed inside the power transmission device 57 so as to be immovable in the axis of rotation direction (the left-right direction in FIG. 1). The driven-side pulley 571 is connected by a driving belt 572 to a driving-side pulley 20 of the electric motor 10. The outer diameter of the driving-side pulley 20 is configured to be smaller than the outer diameter of the driven-side pulley 571.

According to the above configuration, when the electric motor 10 is driven, rotation of the electric motor 10 is reduced by the driving belt 572 and transmitted to the driven-side pulley 571. Rotation of the driven-side pulley 571 acts as an assist force that causes the rack shaft 55 to linearly move. As a result, the electric motor 10 provides assisting steering force to the steered wheels 56R, 56L.

(Configuration of Electric Motor)

Figure 2:
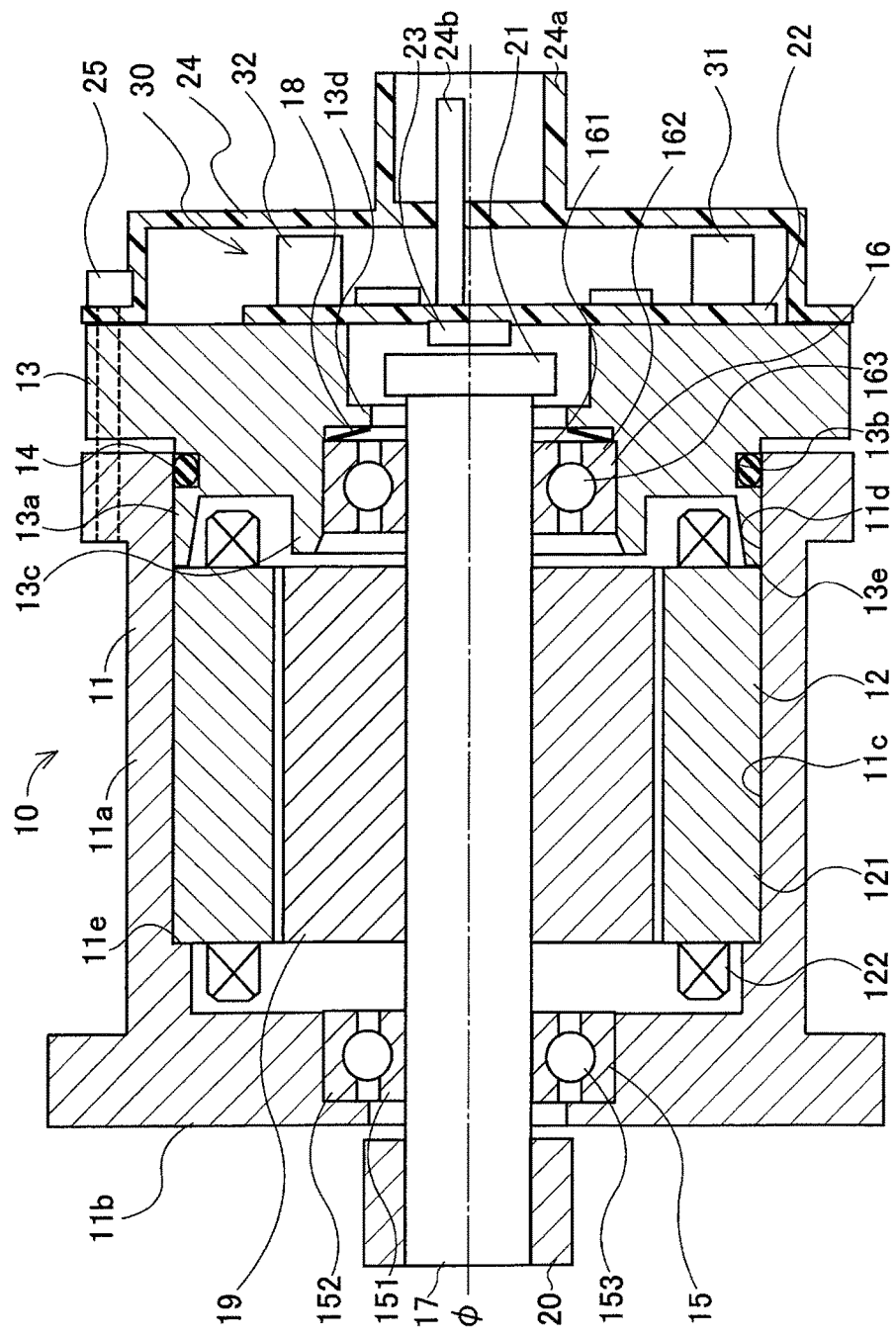
FIG. 2 is a cross sectional view along an axis of rotation of an electric motor according to an embodiment of the present disclosure.

Next, the configuration of the electric motor 10, which is included in the electric power steering device 50, will be explained with reference to FIG. 2. In FIG. 2, the center of rotation of a rotor shaft 17 is shown as an axis of rotation $\varphi$. Further, in the below explanation, the direction in which the axis of rotation $\varphi$ extends will be simply referred to as the axis of rotation direction. In addition, in the axis of rotation direction, the side closer toward the driving-side pulley 20 (i.e., the left side in FIG. 2) is the rear side of the electric motor 10, while the opposite side (i.e., the right side in FIG. 2) is the front side of the electric motor 10. The front portion of the electric motor 10 corresponds to one end in the axis of rotation direction, while the rear portion of the electric motor 10 corresponds to an other end in the axis of rotation direction. Further, a direction from the outer peripheral of the electric motor 10 toward the rotor shaft 17 will be referred to as radially inward, while the opposite direction will be referred to as radially outward.

As described above, the electric motor 10 of the present embodiment is for assisting steering in the vehicle 70 that the electric power steering device 50 is mounted in. However, the electric motor 10 of the present disclosure is not limited to such a use. The electric motor 10 may be used to drive vehicle devices aside from the electric power steering device 50, to drive general industrial machinery, to drive residential appliances, and such. Further, the electric motor 10 of the present embodiment is formed from a brushless DC motor, but is not limited to this example. The electric motor 10 may be a synchronous motor, an induction motor, or other types of electric motors.

As shown in FIG. 2, the electric motor 10 includes a frame 11 (corresponding to a housing) formed from an aluminum alloy or a resin material with good thermal conductivity. The frame 11 is substantially cylindrical and opens at the front in the axis of rotation direction. The frame 11 includes a cylinder portion 11a and a bottom portion 11b. The bottom portion 11b is connected to the rear end of the cylinder portion 11a in the axis of rotation direction, and extends radially inward. Alternatively, the frame 11 may be formed from only the cylinder portion 11a, with the bottom portion 11b being separate. A stator 12 is attached to an inner circumferential surface 11c of the cylinder portion 11a. The stator 12 is formed by winding a stator coil 122 on each teeth of a substantially cylindrical stator core 121 formed from a plurality of laminated magnetic steel sheets. A configuration for fixing the stator 12 to the frame 11 will be explained below.

A heat sink 13 is positioned at the front end of the frame 11 so as to close an opening 11d of the frame 11. The heat sink 13 is formed from a metal with good heat conductivity such as an aluminum alloy, copper, or the like, and has a volume sufficient to dissipate heat generated by a control substrate 22 which will be explained later. The heat sink 13 includes a rear end portion 13a which is inserted from the opening 11d into the inside of the frame 11 (corresponding to an inside of a housing), and the rear end portion 13a is fitted with the inner circumferential surface 11c of the cylinder portion 11a. An O-ring groove 13b (corresponding to a fitting position between a housing and a heat sink) is formed on the outer circumferential surface of the heat sink 13. Further, the outer circumferential surface of the heat sink 13 fits with the inner circumferential surface 11c of the cylinder portion 11a. An O-ring 14 (corresponding to a seal member) formed from a synthetic rubber material is mounted in the O-ring groove 13b to cut off communication between inside and outside of the electric motor 10. Alternatively, the O-ring 14 may be mounted in an O-ring groove formed on the inner circumferential surface 11c of the frame 11 instead. Further, instead of the O-ring 14, communication between inside and outside of the electric motor 10 may be cut off by using a square ring, a lipped seal member, or the like.

A rear bearing 15 (corresponding to a first bearing) is mounted at an inner periphery edge of the bottom portion 11b of the frame 11. Further, a front bearing 16 (corresponding to a second bearing) is mounted at an inner periphery portion of the heat sink 13. The rotor shaft 17 (corresponding to a shaft) is rotatably mounted in the frame 11 and the heat sink 13 through the rear bearing 15 and the front bearing 16.

The rear bearing 15 includes an inner race 151, an outer race 152 (corresponding to one of the outer races), and steel balls 153 (corresponding to a rolling element). The rotor shaft 17 is fixedly press fit into the inner race 151. The outer race 152 is disposed outward in the radial direction with respect to the inner race 151, and is rotatable with respect to the inner race 151. The steel balls 153 are interposed between the inner race 151 and the outer race 152. Further, the outer race 152 is fixed to the bottom portion 11b of the frame 11 (corresponding to one of a housing and a heat sink) by press fitting or caulking.

The front bearing 16 includes an inner race 161, an outer race 162 (corresponding to an other one of the outer races), and steel balls 163 (corresponding to a rolling element). The rotor shaft 17 is fixedly press fit into the inner race 161. The outer race 162 is disposed outward in the radial direction with respect to the inner race 161, and is rotatable with respect to the inner race 161. The steel balls 163 are interposed between the inner race 161 and the outer race 162.

For both the rear bearing 15 and the front bearing 16, there is looseness between the inner races 151, 161 and the steel balls 153, 163, and between the outer races 152, 162 and the steel balls 153, 163. Accordingly, the rotor shaft 17 is movable in the axis of rotation direction by a fixed amount.

A bearing guide 13c protrudes from the rear end portion 13a of the heat sink 13 toward the rear in the axis of rotation direction. The bearing guide 13c retains the outer periphery of the outer race 162 of the front bearing 16. The outer race 162 is not fixed with respect to the bearing guide 13c, and is configured to be movable in the axis of rotation direction with respect to the heat sink 13 (corresponding to an other one of a housing and a heat sink). The bearing guide 13c is positioned radially inward with respect to the stator coil 122, and extends further toward the rear in the axis of rotation direction as compared to a coil end portion of the stator coil 122. Accordingly, the bearing guide 13c overlaps with the stator coil 122 in the radial direction (the up-down direction in FIG. 2).

A spring retainer 13d (corresponding to a biasing member retainer) is formed in the heat sink 13. The spring retainer 13d faces the outer race 162 of the front bearing 16 in the axis of rotation direction, and extends inward in the radial direction. A disc spring 18 (corresponding to an elastic member) is disposed between the spring retainer 13d and the outer race 162 of the front bearing 16. The disc spring 18 generates an elastic force between the spring retainer 13d and the outer race 162, and presses the outer race 162 rearward in the axis of rotation direction. As a result of the outer race 162 receiving the pressing force from the disc spring 18, the rotor shaft 17 is biased through the steel balls 163 and the inner race 161. As a result, the rotor shaft 17, along with the inner race 151 of the rear bearing 15, is biased to be positioned rearward.

It should be noted that, alternatively, a spring retainer may be formed in the bottom portion 11b of the frame 11 instead. In this case, the disc spring 18 is disposed between the outer race 152 of the rear bearing 15 and the spring retainer formed in the bottom portion 11b, and due to the biasing force of the disc spring 18, the rotor shaft 17 is biased so as to be positioned frontward. Further, in this case, the outer race 162 of the front bearing 16 may be fixed to the heat sink 13, and the outer race 152 of the rear bearing 15 may be formed to be movable in the axis of rotation direction with respect to the bottom portion 11b of the frame 11.

The rotor shaft 17 is fixedly press fit with a rotor 19. Accordingly, the rotor 19 is rotatably mounted with respect to the frame 11 and the heat sink 13. The rotor 19 is positioned to face the stator 12 in the radial direction with a fixed gap therebetween. Here, the rotor 19 is formed by placing a plurality of field pole magnets (not illustrated) within a rotor core of laminated steel sheets. As described below, when the stator coil 122 is supplied with power, a rotating magnetic field is generated. Then, the rotor 19 rotates due to the resulting attraction and repulsion forces.

Further, the driving-side pulley 20 as described previously is fixed to the rear end of the rotor shaft 17. As described previously, the driven-side pulley 571 of the power transmission device 57 is connected to the driving-side pulley 20 through the driving belt 572. Moreover, a sensor magnet 21 is attached to the front end of the rotor shaft 17.

A control substrate 22 is fixed to the front surface of the heat sink 13 by a plurality of screws (not illustrated) such that the control substrate 22 abuts the front surface of the heat sink 13. The control substrate 22 is a printed circuit board formed from epoxy resin. A controller 30 that controls a supply of electric power to the stator 12 is formed on the control substrate 22. As shown in FIG. 2, the controller 30 includes a choke coil 31 and a capacitor 32 formed on the front surface of the control substrate 22. In addition to these elements, an inverter 33 (which will be explained with reference to FIG. 3) and the like is also provided on the control substrate 22. The inverter 33 is formed from a plurality of MOS-FETs (metal-oxide-semiconductor field effector transistor). Heat generated by each of these heat generating elements on the control substrate 22 is dissipated by the heat sink 13.

A rotation angle sensor 23 is attached to the rear surface of the control substrate 22 so as to face the previously described sensor magnet 21. The rotation angle sensor 23 is formed from a magnetic resistive element or a Hall element, and detects a rotation angle of the rotor 19 by sensing changes in the magnetic field generated by the sensor magnet 21.

A motor cover 24 is attached to the front end of the heat sink 13 so as to cover the control substrate 22. The motor cover 24 is integrally formed from synthetic resins in a substantially dish shape. Adhesives are provided at the joining portions between the motor cover 24 and the front end of the heat sink 13, which forms a liquid-tight seal from the outside of the electric motor 10. A waterproof connector 24a is formed on the front surface of the motor cover 24. A connector terminal 24b that protrudes frontward from the control substrate 22 is inserted into the waterproof connector 24a.

(Circuit Configuration of Controller)

Figure 3:
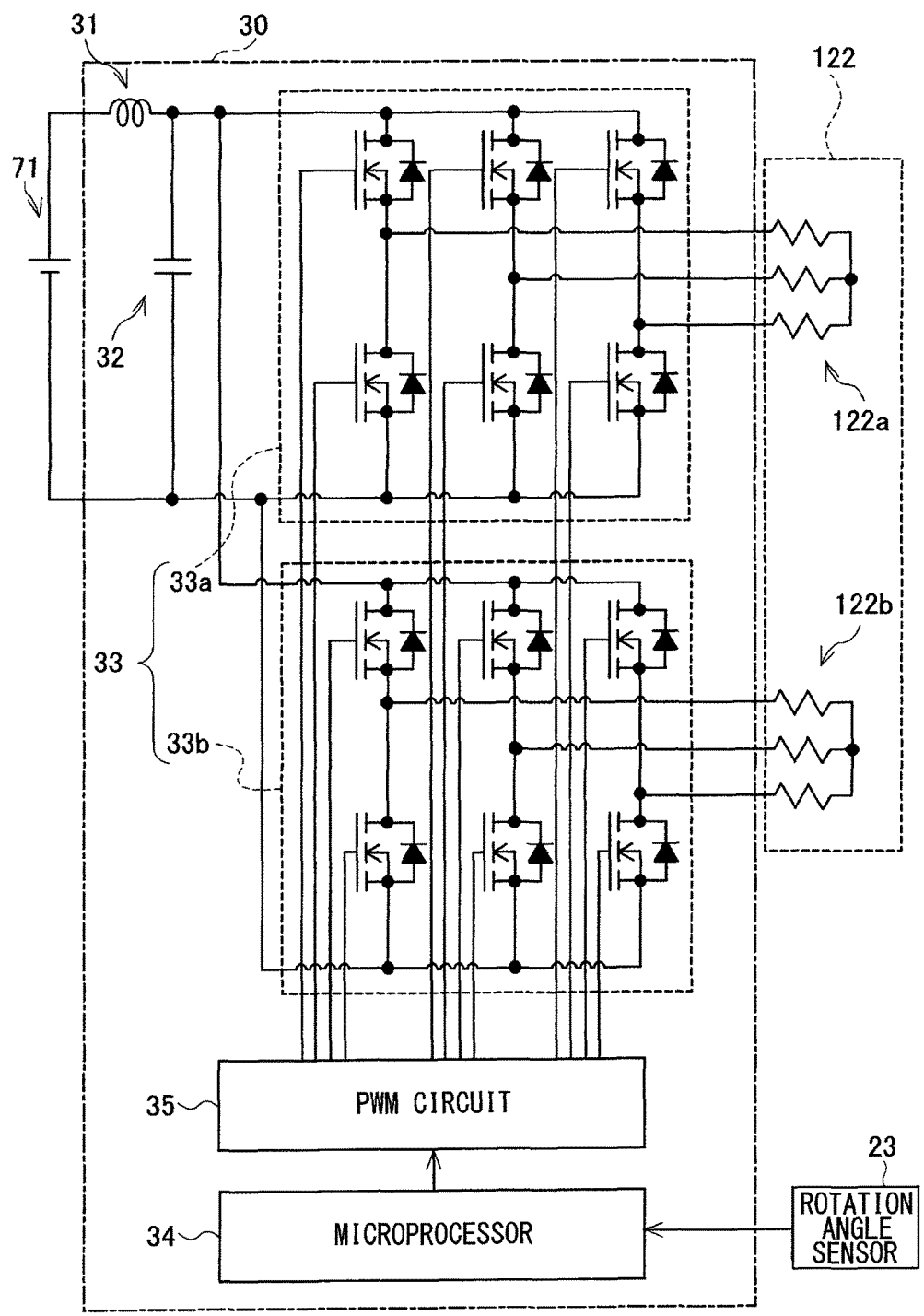
FIG. 3 is a circuit diagram of a controller of an electric motor.

Next, an explanation of the controller 30 formed on the control substrate 22 will be provided with reference to FIG. 3. A vehicle battery 71 mounted on the vehicle 70 is connected to the choke coil 31 and the capacitor 32 of the controller 30. The choke coil 31 and the capacitor 32 form a filter that reduces noise leaking into the controller 30 as well as noise leaking out from the controller 30. Further, the choke coil 31 smoothes the voltage from the vehicle battery 71, and reduces the pulsations of this voltage.

As shown in FIG. 3, the previously described stator coil 122 may be formed from two sets of three-phase windings 122a, 122b. The inverter 33 includes two systems of inverter circuits 33a, 33b which are connected to the three-phase windings 122a, 122b, respectively, in order to supply three-phase AC current to the three-phase windings 122a, 122b.

The rotation angle sensor 23 is connected to a microprocessor 34 included in the controller 30. The microprocessor 34 generates a three-phase voltage control signal based on detection values from the rotation angle sensor 23, a torque sensor (not illustrated) of the vehicle 70, and the like. The microprocessor 34 then sends the three-phase voltage control signal to a PWM (pulse width modulation) circuit 35. The PWM circuit 35 generates a PWM signal based on the three-phase voltage control signal, and transmits the PWM signal to the inverter circuits 33a, 33b. Each of the inverter circuits 33a, 33b are switched according to the PWM signal, generates a requested AC voltage, and supplies the AC voltage to the three-phase windings 122a, 122b.

Further, in the configuration of the controller 30 shown in FIG. 3, some electric components may be omitted, and some electric components or circuits which are not illustrated may be added.

(Configuration of Frame and Stator)

Next, details for fixing the stator 12 to the frame 11 will be explained. A stepped portion 11e (corresponding to a locking portion) is formed on the inner circumferential surface 11c of the cylinder portion 11a discussed previously. The stepped portion 11e is engaged with the rear end of the outer circumferential surface of the stator core 121, and the stator 12 is restricted from moving rearward in the axis of rotation direction.

A pressing portion 13e protrudes rearward in the axis of rotation direction from a rear edge portion of the heat sink 13 (corresponding to a side of the heat sink 13 facing toward an other end in the axis of rotation direction). The pressing portion 13e abuts a front edge of the stator core 121. When the heat sink 13 and the frame 11 are assembled, the pressing portion 13e protrudes to overlap with the coil end portion of the stator coil 122 in the radial direction.

When the stator 12 is fixed to the frame 11, the stator 12 is positioned on the inner circumferential surface 11c of the frame 11 and the heat sink 13 is inserted into the opening 11d of the frame 11. Further, a plurality of fastening bolts 25 (corresponding to a fastening member) which penetrate through the motor cover 24 and the heat sink 13 are fastened to the frame 11. As a result, the heat sink 13 is moved rearward in the axis of rotation direction with respect to the frame 11, and the pressing portion 13e of the heat sink 13 biases the stator 12 toward the rear. Accordingly, the stator 12 is held between the pressing portion 13e and the stepped portion 11e of the frame 11, and is fixed to the frame 11.

Alternatively, the fastening bolts 25 may fasten the frame 11 without penetrating through the motor cover 24. In other words, the fastening bolts 25 only penetrate through the heat sink 13 to fasten to the frame 11, and once the stator 12 is fixed to the frame 11, the motor cover 24 may be fastened to the front end of the heat sink 13.

In the present embodiment, in addition to holding the stator 12 between the pressing portion 13e and the steeped portion 11e of the frame 11, the stator 12 is shrink fit with the inner circumferential surface 11c of the frame 11. In other words, the outer diameter of the stator core 121 is formed to be larger than the inner diameter of the inner circumferential surface 11c of the frame 11. Thus, when the stator 12 is being inserted into the frame 11, the frame 11 is heated to expand the inner diameter of the frame 11 such that the stator 12 may be movable, thereby fitting the frame 11 with the stator 12. Thereafter, while the stator 12 is held between the pressing portion 13e and the stepped portion 11e, the frame 11 is cooled and contracts, thereby retaining the stator 12 in the frame 11.

(Details of Heat Sink)

Figure 4:
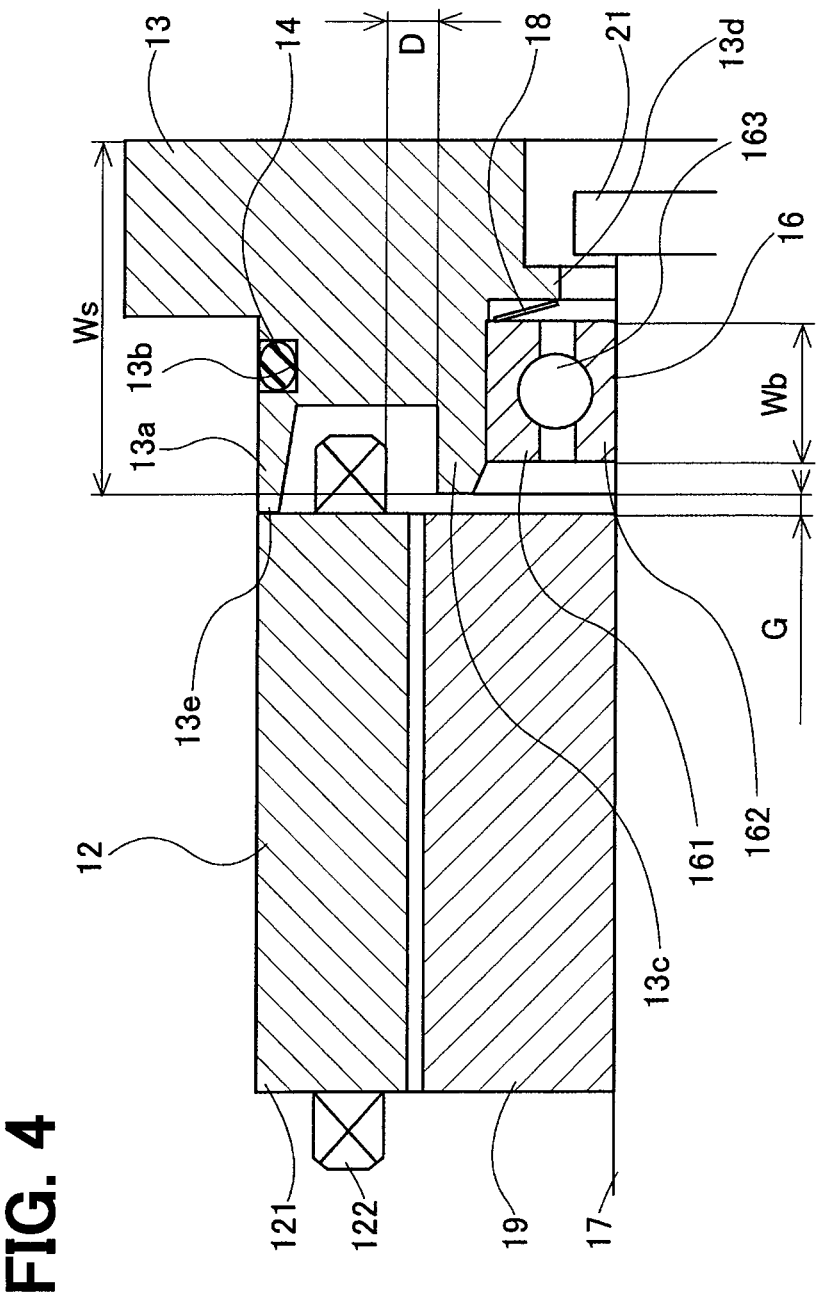
FIG. 4 is an enlarged view of the electric motor of FIG. 2.

Next, the detailed shape of the heat sink 13 will be explained with reference to FIG. 4. As shown in FIG. 4, a width Ws of the heat sink 13 in the axis of rotation direction is set to be larger than a width Wb of the front bearing 16 in the axis of rotation direction.

Further, as described before, the bearing guide 13c of the heat sink 13 extends rearward in the axis of rotation direction to overlap with the coil end portion of the stator coil 122 in the radial direction. Accordingly, a gap G in the axis of rotation direction between the rotor 19 and the bearing guide 13c of the heat sink 13 is set to be a minimum value.

Further, the position of the bearing guide 13c in the radial direction is set to be close to the coil end portion of the stator coil 122. Thus a gap D in the radial direction between the bearing guide 13c and the stator coil 122 is also set to be a minimum value within a range in which the functionality of the electric motor 10 is not compromised.

(Assembly of Electric Motor)

Figure 5A:
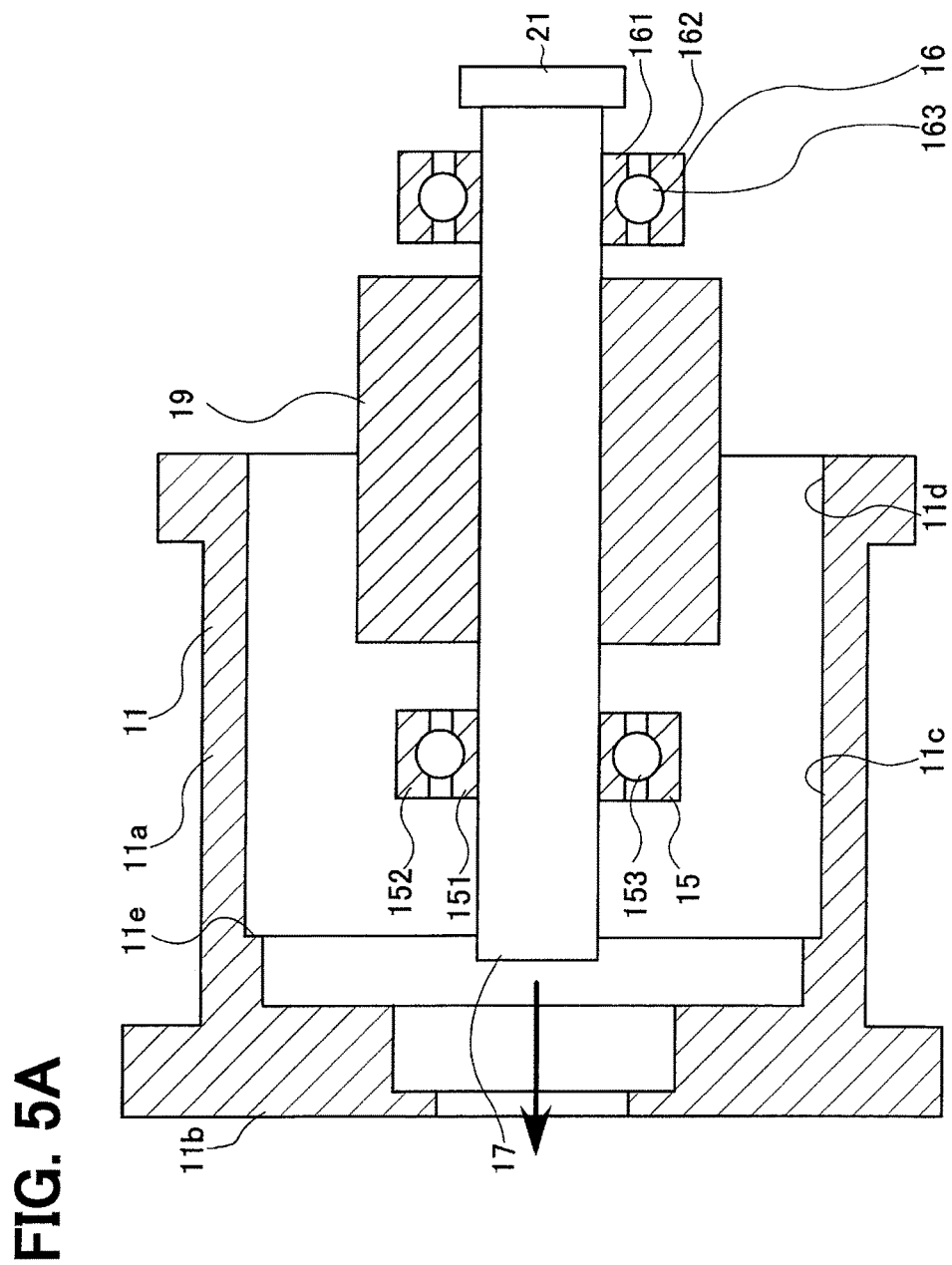
FIG. 5A is a simplified view showing an assembly process of an electric motor in which a rotor is mounted to a frame.
Figure 5B:
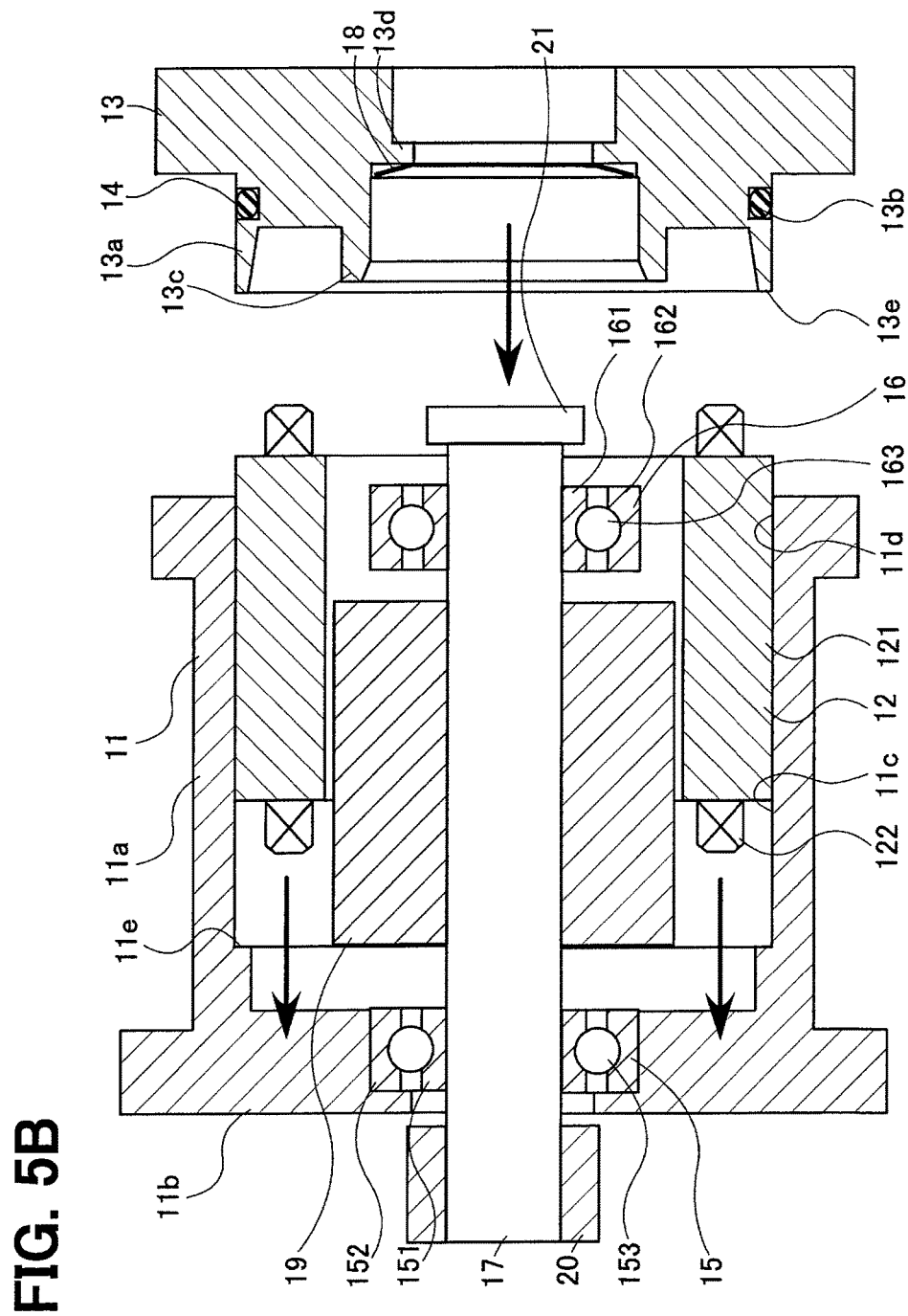
FIG. 5B shows a step of inserting a stator and a heat sink into a frame.
Figure 5C:
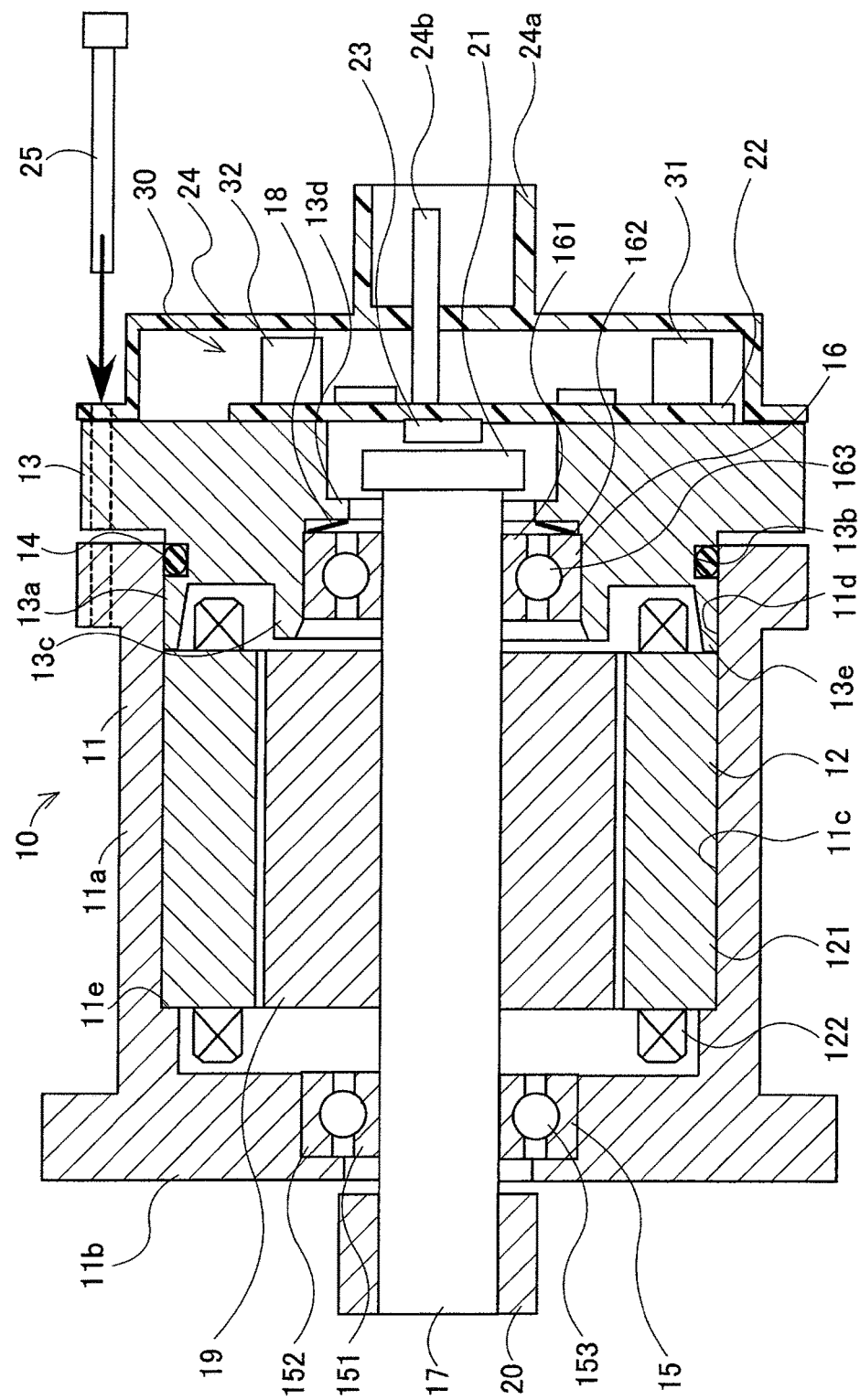
FIG. 5C shows a step of fixing a stator to a frame.

Next, a simple explanation of a method of assembling the electric motor 10 will be provided with reference to FIGS. 5A to 5C. The following process is followed when assembling the electric motor 10.

(i) The rotor shaft 17, which is press fit into the rotor 19, is mounted in the frame 11 along with the rear bearing 15 and the front bearing 16 (rotor mounting step: FIG. 5A).

(ii) After inserting the stator 12 into the frame 11, the heat sink 13 is fit into the opening 11d of the frame 11 (heat sink inserting step: FIG. 5B).

(iii) After attaching the control substrate 22 and the motor cover 24 to the heat sink 13, the fastening bolts 25 are fastened from above the motor cover 24, and the stator 12 is fixed to the frame 11 (stator fixing step: FIG. 5C).

(Effects of Present Embodiment)

According to the present embodiment, the fastening bolts 25 penetrate through the heat sink 13 and are fastened to the frame 11. Accordingly, the heat sink 13 is moved rearward in the axis of rotation direction, and the stator 12 is fixedly held between the pressing portion 13e of the heat sink 13 and the stepped portion 11e of the frame 11. As a result, when manufacturing the electric motor 10, it is not necessary to ensure that an interference exists between the outer diameter of the stator 12 and the inner diameter of the frame 11, and the stator 12 may be movable in the axis of rotation direction with respect to the frame 11. Accordingly, it is not necessary to strictly control the dimensions of the outer diameter of the stator 12 and the inner diameter of the frame 11, and the electric motor 10 may be manufactured easily. Further, the stator 12 may be fixedly held between the pressing portion 13e of the heat sink 13 and the stepped portion 11e of the frame 11 without stator 12 being mated to the frame 11. Accordingly, the retention force applied by the frame 11 on the stator 12 may be improved.

In addition, the heat sink 13 abuts the stator core 121 through the pressing portion 13e. Accordingly, the heat generated by the control substrate 22 is transmitted through the heat sink 13 and the stator core 121 to the frame 11, and as a result heat dissipation of the control substrate 22 may be improved.

Further, in addition to fixedly holding the stator 12 between the pressing portion 13e and the stepped portion 11e, the stator 12 is shrink fit with the inner circumferential surface 11c of the frame 11. Accordingly, the stator 12 may be more accurately positioned with respect to the frame 11 in the radial direction (i.e., concentricity). Further, due to the shrink fitting, the retention force applied by the frame 11 on the stator 12 may be improved.

Further, the rear bearing 15 is mounted at the inner periphery edge of the bottom portion 11b of the frame 11, and the front bearing 16 is mounted at the inner periphery portion of the heat sink 13. Then, the rotor shaft 17 is rotatably mounted in the frame 11 and the heat sink 13 through the rear bearing 15 and the front bearing 16. The rotor 19 is fixed to the rotor shaft 17. Accordingly, the rotor shaft 17 is retained between the inner peripheral edge of the frame 11 to which the stator 12 is mounted, and the inner peripheral edge of the heat sink 13 which is joined to the frame 11. As a result, the concentricity of the rotor 19 with respect to the stator 12 may be improved.

It should be noted that when machining the frame 11, the step of forming the inner circumferential surface 11c and the step of forming the engagement portion for the rear bearing 15 may be performed in succession without removing the frame 11 from a chuck. Further, when machining the heat sink 13, the step of forming the engagement portion for the frame 11 and the step of forming the engagement portion for the front bearing 16 may be performed in succession without removing the heat sink 13 from a chuck. As a result, the concentricity of the rotor 19 with respect to the stator 12 may be further improved. Further, if the inner circumferential surface 11c and the engagement portion for the rear bearing 15 are simultaneously machined on the frame 11 using a stepped cutter or the like, and if the engagement portion for the frame 11 and the engagement portion for the front bearing 16 are simultaneously machined on the heat sink 13, the concentricity of the rotor 19 with respect to the stator 12 may be further improved.

Further, the front bearing 16 is mounted on the inner periphery of the heat sink 13, and the rear bearing 15 is mounted on the bottom portion 11b of the frame 11. Accordingly, heat generated by the front bearing 16 may be dissipated through the heat sink 13, and heat generated by the rear bearing 15 may be dissipated through the frame 11, thereby improving heat dissipation.

Further, since the front bearing 16 is mounted to the inner periphery of the heat sink 13, it is not necessary to specifically provide a mounting member for the front bearing 16. Accordingly, the electric motor 10 may be miniaturized in the axis of rotation direction, and the number of components in the electric motor 10 may be reduced.

In addition, the outer race 162 of the front bearing 16 is configured to be movable in the axis of rotation direction with respect to the heat sink 13. The heat sink 13 includes the spring retainer 13d that faces the outer racer 162 of the front bearing 16 in the axis of rotation direction. And, the disc spring 18 id disposed between the spring retainer 13d and the outer racer 162 to press the outer race 162 rearward in the axis of rotation direction. As a result, the rotor shaft 17 may be positioned along the axis of rotation direction without increasing the positional accuracy of the engagement portion for the rear bearing 15 of the frame 11 and the engagement portion for the front bearing 16 of the heat sink 13. Further as a result, the electric motor 10 may be manufactured easily.

Further, the rear end portion 13a of the heat sink 13 in the axis of rotation direction is inserted from the opening 11d of the frame 11 into the frame 11, and is fitted against the inner circumferential surface 11c of the frame 11. Accordingly, the heat sink 13, which is inserted into the frame 11, overlaps with the cylinder portion 11a of the frame 11 in the radial direction, and the electric motor 10 may be miniaturized in the axis of rotation direction.

Further, the bearing guide 13c is formed on the heat sink 13 to retain the outer periphery of the outer race 162 of the front bearing 16. The bearing guide 13c is positioned inward in the radial direction with respect to the stator coil 122, and overlaps with the stator coil 122 in the radial direction. Accordingly, the gap G in the axis of rotation direction between the rotor 19 and the bearing guide 13c of the heat sink 13 is set to be a minimum value. As a result, the electric motor 10 may be further miniaturized in the axis of rotation direction.

In addition, the position of the bearing guide 13c in the radial direction is set to be close to the stator coil 122. Thus the gap D in the radial direction between the bearing guide 13c and the stator coil 122 is also set to be a minimum value. Accordingly, the amount of dead space within the frame 11 is reduced, and the electric motor 10 may be miniaturized in the axis of rotation direction. Further, since the gap D in the radial direction between the bearing guide 13c and the stator coil 122 is reduced, heat dissipation from the stator coil 122 through the heat sink 13 may be improved.

In addition, the width Ws of the heat sink 13 in the axis of rotation direction is set to be larger than the width Wb of the front bearing 16 in the axis of rotation direction. Accordingly, when the electric motor 10 is rotating, heat generated at the front bearing 16 is sufficiently dissipated by the heat sink 13.

In addition, the electric motor 10 is included in the electric power steering device 50, and provides assisting steering force to the steered wheels 56R, 56L of the vehicle 70. Thus, since the electric motor 10 according to the configuration of the present embodiment may be miniaturized, the electric power steering device may be easily positioned within the narrow spaces around the steered wheels 56R, 56L without sacrificing performance.

In addition, the O-ring 14 is provided at the fitting position between the heat sink 13 and the frame 11 to cut off communications between inside and outside of the electric motor 10. Accordingly, the number of components may be minimized, and waterproofing of the outside surface of the electric motor 10 may be improved with a simple configuration.

(Other Embodiments)

The present disclosure is not limited to the above described embodiments, and a variety of modifications are contemplated.

The descriptions of the present disclosure may be applied to an electric generator that generates electric power at the stator 12 when the rotor 19 rotates.

Further, the descriptions of the present disclosure may be applied to an electric motor/generator that acts as both an electric generator and an electric motor.

The invention claimed is:

1. A rotating electrical machine, comprising:
    a housing having at least one end in an axis of rotation direction that is open, the housing being cylindrical;
    a stator fixed to an inner circumferential surface of the housing;
    a rotor rotatably mounted in the housing to face the stator in a radial direction;
    a heat sink disposed to close an opening of the housing; and
    a control substrate abuttedly mounted to the heat sink, the control substrate controlling a supply of electric power to the stator;
    a locking portion formed on the inner circumferential surface of the housing, the locking portion restricting the stator from moving toward an other end in the axis of rotation direction;
    a pressing portion formed on a side of the heat sink facing toward the other end in the axis of rotation direction, the pressing portion abutting the stator; and
    a fastening member that penetrates through the heat sink to fasten to the housing, the fastening member holding the stator between the pressing portion and the locking portion in the axis of rotation direction to fix the stator.

2. The rotating electrical machine of claim 1, wherein an other end of the heat sink in the axis of rotation direction is inserted into the housing from the opening and fitted with the inner circumferential surface of the housing.

3. The rotating electrical machine of claim 2, wherein a seal member is provided at a fitting position between the housing and the heat sink to cut off communication between inside and outside of the housing.

4. The rotating electrical machine of claim 1, wherein the housing includes
    a cylinder portion, the stator being mounted to the cylinder portion, and
    a bottom portion that extends inward in the radial direction, the bottom portion being connected to an other end of the cylinder portion in the axis of rotation direction,
    a first bearing is mounted at an inner periphery edge of the bottom portion,
    a second bearing is mounted at an inner periphery portion of the heat sink,
    a shaft is rotatably mounted in the housing and the heat sink through the first bearing and the second bearing, and
    the rotor is fixed to the shaft.

5. The rotating electrical machine of claim 4, wherein
each of the first bearing and the second bearing includes
   an inner race fixed to the shaft,
   an outer race disposed outward in the radial direction with respect to the inner race, the outer race being rotatable with respect to the inner race, and
   a rolling element interposed between the inner race and the outer race,
one of the outer races is fixed to one of the housing and the heat sink,
an other one of the outer races is configured to be movable in the axis of rotation direction with respect to an other one of the housing and the heat sink,
the other one of the housing and the heat sink includes a biasing member retainer that faces the other one of the outer races in the axis of rotation direction,
an elastic member is disposed between the biasing member retainer and the other one of the outer races, the elastic member pressing the other one of the outer races in the axis of rotation direction.

6. The rotating electrical machine of claim 5, wherein
a bearing guide protrudes from the heat sink toward the other end in the axis of rotation direction, the bearing guide retaining an outer periphery of the other one of the outer races, and
the bearing guide overlaps with a stator coil of the stator in the radial direction.

7. The rotating electrical machine of claim 1, wherein
the stator is shrink fitted with the inner circumferential surface of the housing.

8. The rotating electrical machine of claim 1, wherein
the rotating electrical machine is included in an electric power steering device, and
the rotating electrical machine provides assisting steering force to wheels of a vehicle.

* * * * *